T. WHITE.
GATE VALVE.
APPLICATION FILED AUG. 16, 1912.
1,084,588.
Patented Jan. 13, 1914.
2 SHEETS—SHEET 2.
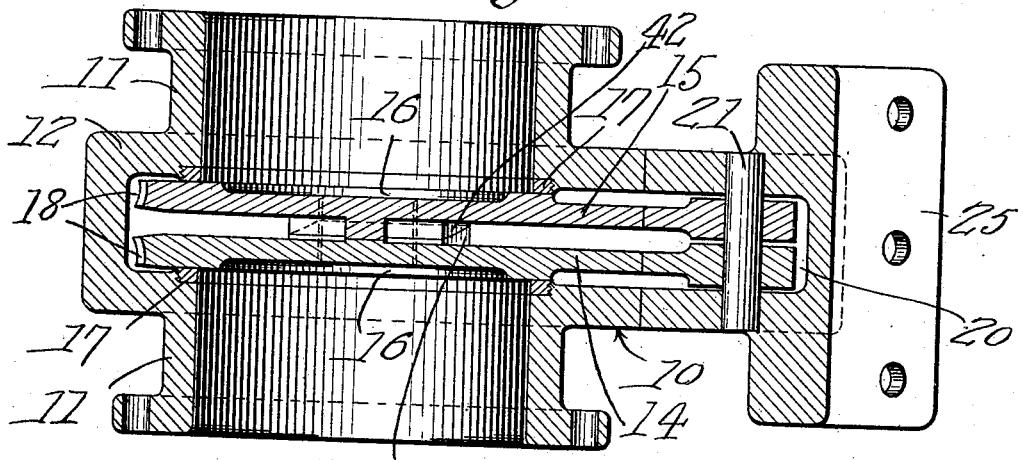
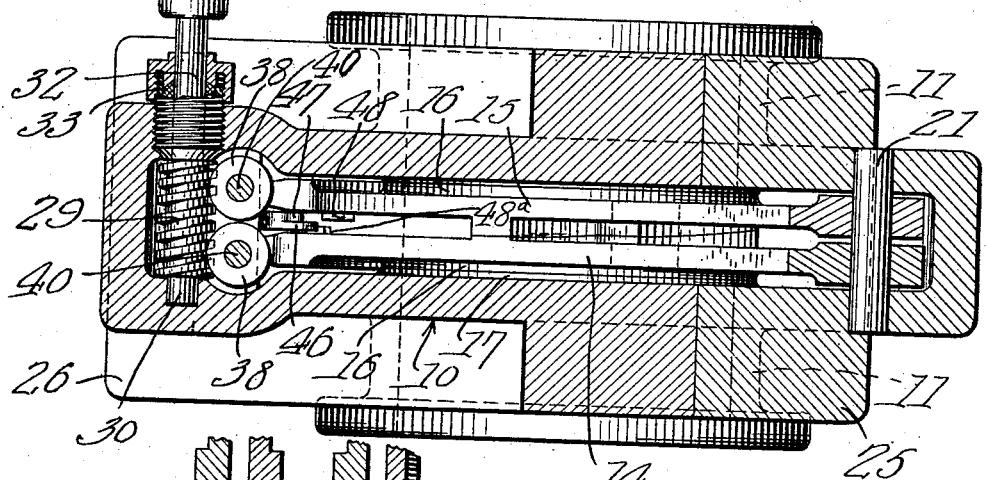
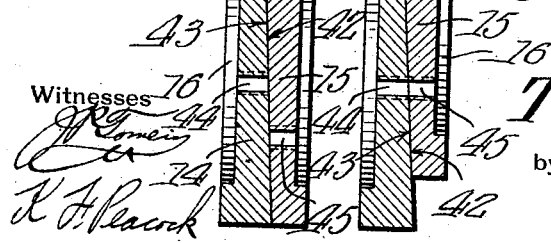
Witnesses
Tilman White, Inventor.
by C. A. Snow & Co.
Attorneys

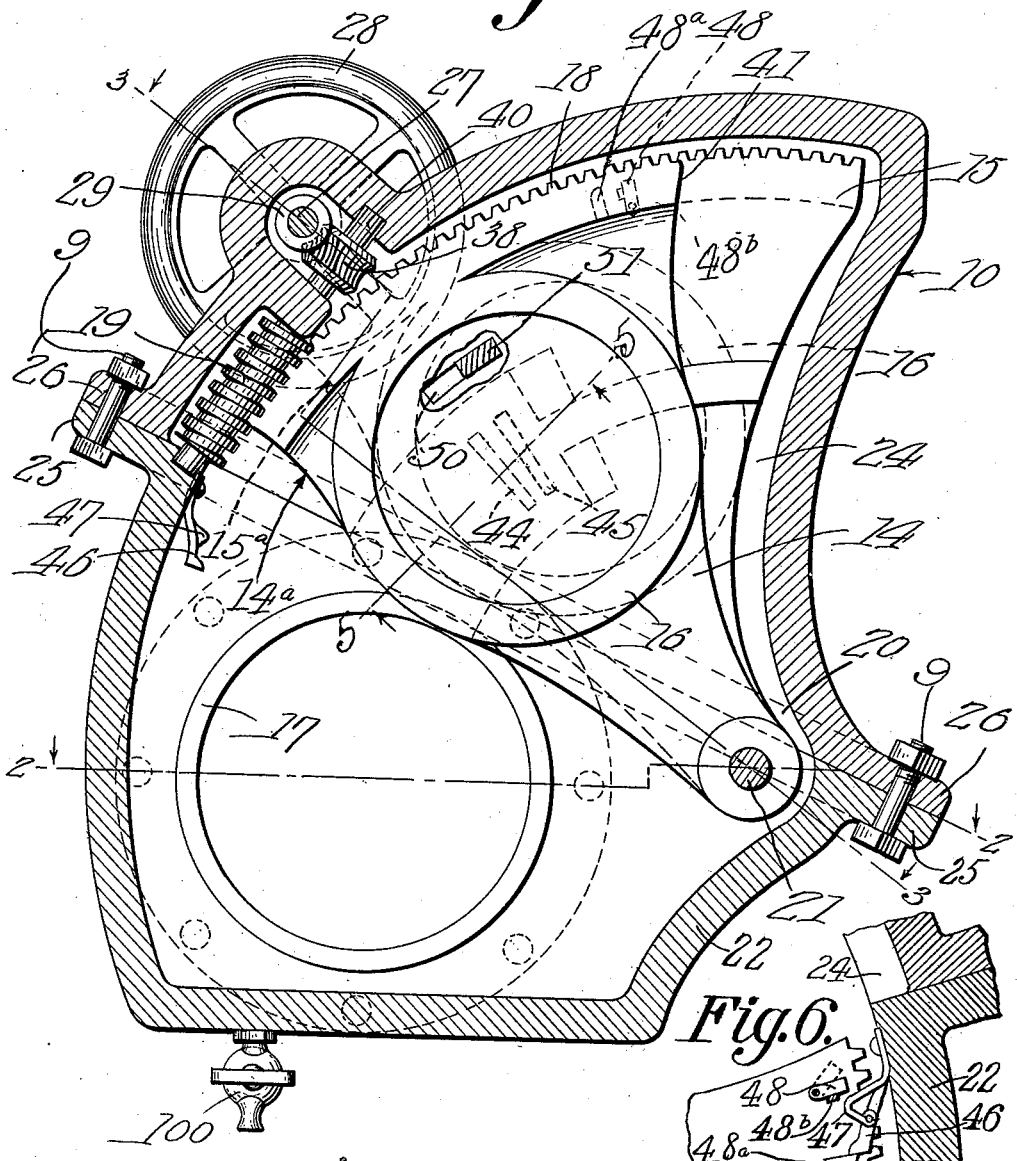

UNITED STATES PATENT OFFICE.

TILMAN WHITE, OF BERKELEY, CALIFORNIA.

GATE-VALVE.

1,084,588.  Specification of Letters Patent.  Patented Jan. 13, 1914.

Application filed August 16, 1912. Serial No. 715,467.

*To all whom it may concern:*

Be it known that I, TILMAN WHITE, a citizen of the United States, residing at Berkeley, in the county of Alameda and State of California, have invented a new and useful Gate-Valve, of which the following is a specification.

This invention relates to an improvement in gate valves.

The primary object of the invention is to provide a construction of this character including a plurality of closures which are arranged to be consonantly actuated to open the valve.

A further object of the invention is to provide a mechanism in which the closures co-act, to contact with the valve seat.

A still further object of the invention is to provide a construction in which the closures which are in the nature of hinge leaves travel as one member during the greater portion of their movement, there being a by-pass provided in each of the leaves, said by-passes registering while the leaves are traveling as one member.

A still further object of the invention is to provide means for maintaining one of the closures in locked relation with respect to the casing to close the valve, the other of the closures being provided with means which when the same is actuated, will release the locking means and allow both of the members to open.

A still further object of the invention is to provide a construction in which one leaf will be raised slightly in advance of the other, the leaves having a connection whereby the other leaf will be lifted after the first mentioned leaf has traveled a certain distance.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a transverse section. Fig. 2 is a longitudinal section taken on the line 2—2 of Fig. 1. Fig. 3 is a section taken on the line 3—3 of Fig. 1.
Fig. 4 is a detailed view of a portion of the leaves when the same are in locked relation and the by-pass is closed. Fig. 5 is a section on the line 5—5 of Fig. 1, the leaves being shifted slightly from the positions shown in Fig. 1. Fig. 6 is a sectional detail showing the coöperation between the latch and the movable leaves.

In the drawing, there is shown a casing 10 comprising a section 22 having a flange 25, and a section 24 having a flange 26, the flanges 25 and 26 being connected by bolts 9, or in any other suitable manner. The constituent sections 22 and 24 of the casing 10 are laterally extended to form a recess 20. The sections 22 and 24 of the casing 10 are provided with opposite disposed nipples 11 which may be connected with a pipe line. The casing 10 is extended beyond the nipples 11, as shown at 12. Mounted in the casing sections 22 and 24 at the inner ends of the nipples 11 are seats 17. The casing 10 may be provided with a blow-out or drain-cock 100, located at any desired point, for the purpose of disposing of the slime which may settle in the casing 10. A pin 21 is terminally mounted in the casing section 22 and is located in the recess 20.

The invention further includes a primary leaf 14 and a secondary leaf 15, the leaves 14 and 15 being mounted to move in parallel relation within the casing 10, the leaves 14 and 15 being supported for pivotal movement upon the pin 21 and for sliding movement longitudinally of the pin. The outer, remote faces of the leaves 14 and 15 are equipped with seats 16, adapted to engage the seats 17 of the casing 10 when the leaves are separated transversely by mechanism to be described hereinafter. In the leaf 14 there is an opening 44, there being an opening 45 in the leaf 15. The adjacent faces of the leaves 14 and 15 are provided respectively with cams 43 and 42. Projecting from the inner face of the leaf 15 is a lug 50, there being a lug 51 projecting from the inner face of the leaf 14. These lugs 50 and 51 lie in a common circumference, the center of which is the pin 21. Projecting inwardly from the leaf 14 is a lug $48^a$, there being a pivoted catch 48 projecting inwardly from the inner face of the leaf 15, the lug $48^a$ being located in advance of the catch 48, movement of the catch 48 in one direction being limited by a stop lug $48^b$ on the leaf 15.

A latch 46 is secured to the section 22 of the casing 10, the latch 46 being alined with the space between the leaves 14 and 15. The latch 46 is equipped with a laterally projecting finger 47. The leaves 14 and 15 are peripherally equipped with racks 18. The inner face of the leaf 14 carries an inclined cam 43 coöperating with a cam 42 upon the inner face of the leaf 15.

Journaled for rotation in the casing 10 are shafts 40 carrying worms 19 meshing into the racks 18 of the leaves 14 and 15. Each shaft 40 carries a worm wheel 38, the worm wheels 38 meshing into a worm 29 carried by a shaft 27, one end 30 of which is journaled in the section 24 of the casing 10, the other end 32 of the shaft 27 passing outwardly through a gland 33 and being terminally provided with a hand wheel 28.

In practical operation the leaves 14 and 15 are raised and lowered by manipulating the shaft 27 through the medium of the hand wheel 28, the worm 29 on the shaft 27 actuating the worm wheels 38 upon the shafts 40, the worms 19 on the shafts 40 engaging the racks 18 of the leaves 14 and 15, it being noted that the lower edge 14ª of the leaf 14 extends beyond the lower edge 15ª of the leaf 15, so that the leaf 14 will be advanced slightly ahead of the leaf 15. Suppose that the leaves 14 and 15 are positioned as shown in Fig. 1. The leaf 15 has ridden off its actuating worm 19 so that it can be lifted no farther. The leaf 14 is still in mesh with its worm 19, and by rotating the shaft 27 the leaf 14 is lifted farther. When the leaf 14 is lifted in the manner above indicated, the lug 51 on the leaf 14 will be spaced from the lug 50 on the leaf 14. The openings 44 and 45 will be brought into alinement by the lifting of the leaf 14 above described. The leaves 14 and 15 are now in open position.

Suppose that a reverse rotation is imparted to the shaft 27. Then, the worms 19 engaging the racks 18 of the leaves 14 and 15, the leaves will be lowered, the openings 44 and 45 being alined to afford a by-pass, and the lug 51 on the leaf 14 being spaced at some distance to the rear of the lug 50 on the leaf 15. Ultimately, the end 41 of the rack 18 of the leaf 14 will ride off the actuating worm 19, the leaf 14 dropping to the bottom of the casing 10, the spacing of the lugs 50 and 51 permitting the leaf 14 to drop. By this operation the openings 45 and 44 will be moved out of alinement, so that a by-pass through the leaves will no longer exist. When the leaf 14 drops to the bottom of the casing 10, the lower end of the latch 46 will engage with the projection 48ª of the leaf 14, and hold the leaf 14 in depressed position, to close one nipple 11. Continued rotation of the shaft 27 will cause the other worm 19 to lower the leaf 15, until the same rests upon the bottom of the casing 10, the openings 44 and 45 being out of alinement, as clearly shown in Fig. 4. When both of the leaves 14 and 15 rest upon the bottom of the casing 10, and are in the position shown in Fig. 4, the cams 42 and 43 of the respective leaves will coact to slide the leaves in opposite directions upon the pin 21, the seats 16 of the leaves 14 and 15 being thrust against the seats 17 of the casing 10. When the leaf 15 drops to the bottom of the casing, the pivoted catch 48 on the leaf 15 will swing, permitting the catch to pass beneath the latch 46.

When it is desired to restore the leaves 14 and 15 to an open position, rotatory movement is imparted to the shaft 27 and therefrom, to both shafts 40. One worm 19, meshing into the rack 18 of the leaf 15, will elevate the leaf 15 until the lug 50 on the leaf 15 engages the lug 51 of the leaf 14. Before the lugs 50 and 51 come into contact, the pivoted catch 48 on the leaf 15, being supported by the stop lug 48ᵇ, will engage the lateral finger 47 of the latch 46 and move the latch 46 out of engagement with the lug 48ª on the leaf 14, so that the coöperating lugs 50 and 51 may elevate the leaves simultaneously.

When the leaf 14 has been lifted sufficiently in the manner hereinbefore described, the rack 18 of the leaf 14 will mesh into one worm 19, whereupon both leaves will move to the position shown in Fig. 1, from which positions the description of the operation began.

What is claimed is:

1. A valve comprising independently movable primary and secondary leaves; interlocking elements for holding the primary leaf against movement, one interlocking element being independent of the leaves, and the other interlocking element being carried by the primary leaf; and means upon the secondary leaf for engaging one of the interlocking elements to break the engagement between the interlocking elements.

2. A valve comprising independently movable primary and secondary leaves; a latch supported in the path of the primary leaf and adapted to engage the primary leaf to hold the primary leaf against movement; and means upon the secondary leaf for engaging the latch to break the engagement between the latch and the primary leaf.

3. A valve comprising independently movable primary and secondary leaves having openings; operating means engaging both leaves to move the leaves simultaneously and to hold the openings in alinement during the simultaneous movement of the leaves, the secondary leaf being actuable by the operating means, independently of the primary leaf, to dispose the openings out of alinement.

4. A valve comprising independently movable primary and secondary leaves having openings; operating means engaging both leaves to move both leaves simultaneously and to hold the openings in alinement during the simultaneous movement of the leaves, the primary leaf being automatically disengageable from the operating means, and the secondary leaf being actuable by the operating means subsequent to the disengagement of the primary leaf from the operating means, to dispose the openings out of alinement; and interengaging elements upon the leaves for restoring the engagement between the primary leaf and the operating means when the secondary leaf is actuated.

5. A valve comprising independently movable primary and secondary leaves having openings; operating means engaging both leaves to move both leaves simultaneously and to hold the openings in alinement during the simultaneous movement of the leaves, the secondary leaf being actuable by the operating means independently of the primary leaf to dispose the openings out of alinement; interlocking elements for holding the primary leaf against movement, one interlocking element being independent of the leaves and the other interlocking element being carried by the primary leaf; and means upon the secondary leaf for engaging one of the interlocking elements to break the engagement between the interlocking elements.

6. A valve comprising independently movable primary and secondary leaves having openings; operating means engaging both leaves to move both leaves simultaneously and to hold the openings in alinement during the simultaneous movement of the leaves, the primary leaf being automatically disengageable from the operating means and the secondary leaf being actuable by the operating means subsequent to the disengagement of the primary leaf from the operating means, to dispose the openings out of alinement; interlocking elements upon the leaves for restoring the engagement between the primary leaf and the operating means when the secondary leaf is actuated; a latch supported in the path of the primary leaf and adapted to engage the primary leaf to hold the primary leaf against movement; and means upon the secondary leaf for engaging the latch to break the engagement between the latch and the primary leaf.

7. A valve including a casing, pivoted segments therein and disposed to travel in parallel relation, means for moving one segment independently of the other, both of said segments being provided with cams which contact during said independent movement, a latch member supported by the casing and disposed to hold one of said segments against movement, and means carried by the other segment and arranged to contact with said latch member to release the first mentioned segment.

In testimony that I claim the foregoing as my own, I have hereto affixed my signature in the presence of two witnesses.

TILMAN WHITE.

Witnesses:
R. D. KNICKERBOCKER,
GEO. F. BLANKENBUEHLER.